(12) United States Patent
Kuhlman et al.

(10) Patent No.: US 8,503,088 B2
(45) Date of Patent: Aug. 6, 2013

(54) WINDSHIELD DISPLAY SYSTEM USING ELECTROWETTING LENSES

(75) Inventors: Frederick F. Kuhlman, Kokomo, IN (US); David K. Lambert, Sterling Heights, MI (US); Dwadasi H. R. Sarma, Kokomo, IN (US); Kris R. Stark, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/332,739

(22) Filed: Dec. 21, 2011

(65) Prior Publication Data
US 2013/0163088 A1 Jun. 27, 2013

(51) Int. Cl.
*G02B 27/14* (2006.01)

(52) U.S. Cl.
USPC .......................................... 359/630

(58) Field of Classification Search
USPC ................................. 359/630–633
See application file for complete search history.

(56) References Cited

U.S. PATENT DOCUMENTS

| | | | | |
|---|---|---|---|---|
| 2005/0270432 | A1* | 12/2005 | Overline | 349/16 |
| 2007/0187242 | A1* | 8/2007 | Nair et al. | 204/450 |
| 2007/0285793 | A1* | 12/2007 | Liu et al. | 359/630 |
| 2010/0302468 | A1* | 12/2010 | Lin | 349/15 |

OTHER PUBLICATIONS

Wei, et al: "The influence of a microlens array on planar organic light-emitting devices", Jan. 13, 2006, pp. 368-374.
Davis Fogerty: "Droplet Magnification of an LED Backlit LCD", Feb. 5, 2011, 8 pages.
Kuiper, et al.: "Variable-focus liquid lens for miniature cameras", Applied Physics Letters, vol. 85, No. 7, Aug. 16, 2004, pp. 1128-1130.
Zhang, et al.: "A full description of a scalable microfabrication process for arrayed electrowetting microprisms", Journal of Micromechanics and Microengineering, 20 (2010) 015044, 13 pages.

* cited by examiner

*Primary Examiner* — Scott J Sugarman
*Assistant Examiner* — Vipin Patel
(74) *Attorney, Agent, or Firm* — Lawrence D. Hazelton

(57) ABSTRACT

A windshield display system for installation into a vehicle that includes a windshield, a transparent display overlaying the windshield, and an array of electrowetting lenses overlaying the transparent display. Each lens of the array is operable to a flat-state where light passes through the lens substantially undistorted, and a shaped-state where emitted light from an underlying portion of the transparent display is directed in order to increase an apparent brightness of the emitted light. The array selectively magnifies pixels or portions of the transparent display, while maintaining vision clarity for the operator in regions of the windshield where images are not being displayed. The array may also outline or highlight images being displayed with a region of distortion of surrounding the image to distort the view of the scene outside the vehicle to help the operator discern the image when the outside lighting conditions are less than ideal.

5 Claims, 2 Drawing Sheets

WINDSHIELD DISPLAY SYSTEM USING ELECTROWETTING LENSES

TECHNICAL FIELD OF INVENTION

This disclosure generally relates to a windshield display system, and more particularly relates to an array of electrowetting lenses overlaying a transparent display on a windshield, where the lenses are operated to direct emitted light from the transparent display in order to increase an apparent brightness of the emitted light.

BACKGROUND OF INVENTION

Various ways have been suggested to equip vehicles with windshields capable of displaying information on the windshield. For example, SuperImaging Inc., owned by Sun Innovations Inc. of Fremont, Calif. has proposed a full-windshield head up display that uses a fluorescent film applied to the inside of a vehicle windshield to display or provide information to a vehicle operator looking through the windshield. Other flexible transparent displays based on organic light emitting diode (OLED) and liquid crystal device (LCD) display technologies are available from a variety of manufacturers such as Samsung, Sony, and NEC would be suitable to apply to a windshield. However, if the ambient light includes bright sunlight, it has been observed that the information displayed may be difficult to see. Vehicle manufacturers desire windshield displays that are readily viewable in all ambient lighting conditions. What is needed is a way to increase the apparent brightness of the display.

SUMMARY OF THE INVENTION

In accordance with one embodiment, a windshield display system is provided. The system is generally configured for installation into a vehicle The system includes a windshield, a transparent display, and an array of electrowetting lenses. The windshield is formed of transparent material. The transparent display overlays the windshield. The array of electrowetting lenses overlays the transparent display. Each lens of the array is operable to a flat-state where light passes through the lens substantially undistorted. Each lens of the array is also operable to a shaped-state where emitted light from an underlying portion of the transparent display is directed in order to increase an apparent brightness of the emitted light.

In another embodiment, the transparent display includes a fluorescent film layer configured to fluoresce where illuminated with suitable light effective to display an image on the fluorescent film layer.

In yet another embodiment, electrowetting lenses that are adjacent to but not overlying the portion emitting light are operated to a shaped-state in order to outline the image being displayed and thereby highlight the image against a background scene outside the vehicle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
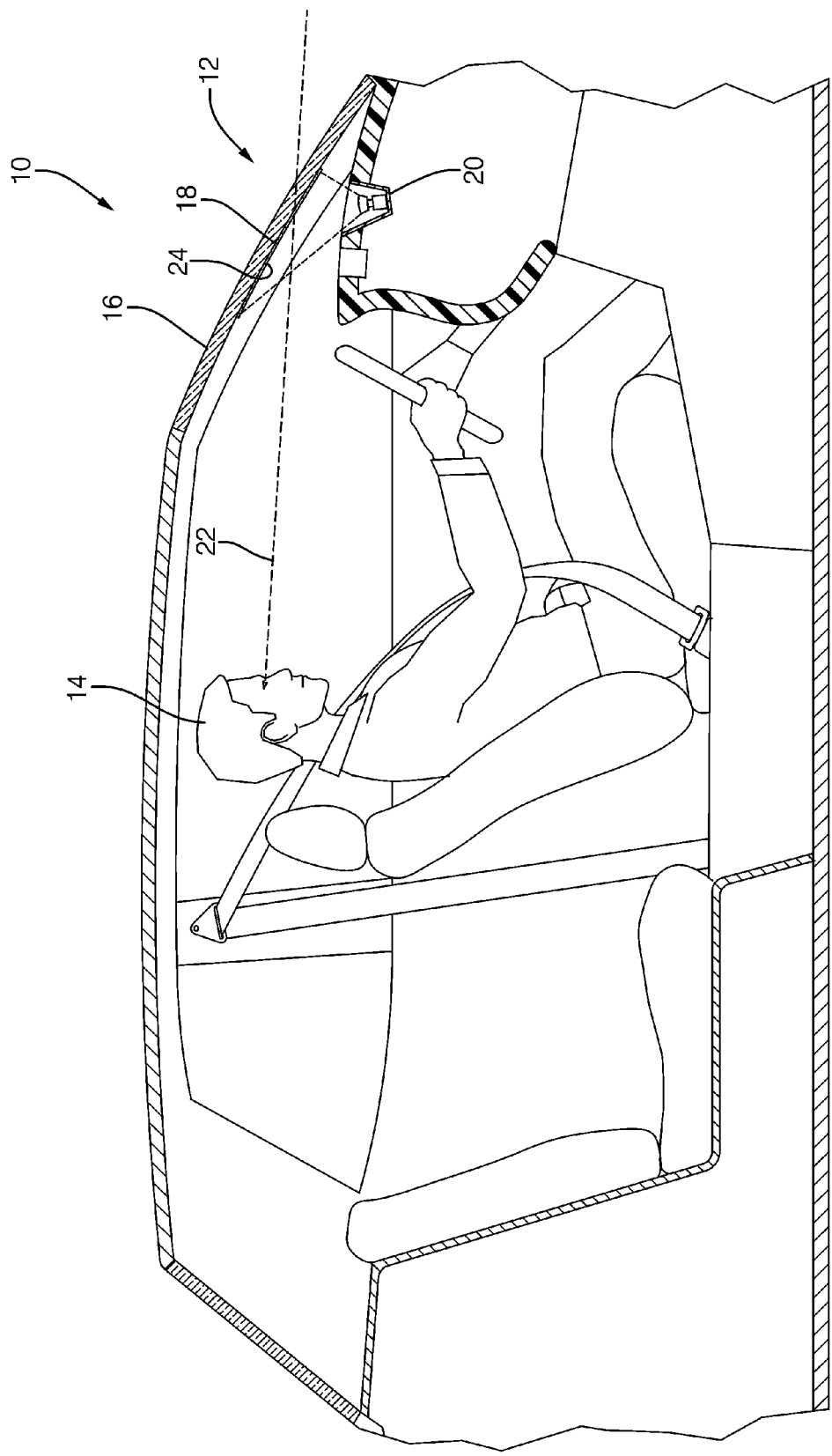
FIG. 1 is a cut-away side view of vehicle equipped with a windshield display system in accordance with one embodiment.

FIG. 1 illustrates a non-limiting example of a vehicle 10, equipped with a windshield display system 12. In general, the system 12 provides what is commonly called a head-up display that allows an operator 14 of the vehicle 10 to view images superimposed onto a windshield 16 of the vehicle 10. The windshield 16 is generally formed of transparent material such as tempered safety glass commonly used in automobiles, or alternatively transparent polymeric material as used in some aircraft. The windshield 16 includes other features known to those skilled in the art to make the windshield suitable for installation into a vehicle.

A transparent display 18 preferably overlays the interior surface the windshield 16 so it is protected from potentially damaging environmental conditions that may be present on the exterior surface of the windshield 16, e.g. airborne debris. In one embodiment, the transparent display 18 may include a passive device such as a film or surface treatment applied to the windshield 16. For example, the transparent display 18 may include a fluorescent film layer configured to fluoresce where illuminated with suitable light patterned in a manner effective to display an image on the fluorescent film layer. SuperImaging Inc., owned by Sun Innovations Inc. of Fremont, Calif. manufactures a suitable fluorescent film marked for use as a head-up display surface. Illumination for the fluorescent film may be provided by an ultraviolet (UV) laser 20 configured to illuminate the fluorescent film layer with suitable light, and shape or scan the suitable light projected in order to project a reconfigurable image. Alternatively, the illumination for the fluorescent film may be from a fixed feature type source of UV light that displays predetermined shapes such as turn signal indicators or numerals indicating vehicle speed, for example a UV light emitting diode projecting light through a predetermined shaped aperture. FIG. 1 illustrates that the transparent display 18 only covers a portion of the windshield 16. However it should be appreciated that the transparent display could cover the entire windshield 16, and it is recognized that more than a single UV laser 20 may be needed to project images over the entire windshield 16.

Alternatively, the transparent display 18 may include an active device or active display layer such an organic light emitting diode (OLED) layer or a liquid crystal device (LCD) layer. In the case of the OLED layer, the OLED emits light directly without being illuminated with an external light source. The LCD device may require an external source of illumination, for example illumination via a light pipe proximate to the LCD device, or by using the windshield 16 as a light pipe.

Prior attempts to use the transparent display 18 alone to provide a windshield display showed that such transparent displays aren't bright enough to be easily viewed in bright sunlight. It has been proposed to overlay the transparent display 18 with an array of microlenses to improve the portion of available light that is directed to the operator.

Such an array is described in a paper entitled—The Influence of a Microlens Array on Planar Organic Light-Emitting Devices, by Wei et al., published Jan. 13, 2006 by National Dong Hwa University, Hualien, Taiwan 974, Republic of China. However, it was observed that the microlenses objectionably distorted the view of objects outside the vehicle 10 located proximate to a line of site 22 for the operator 14.

In order to provide the benefits of a microlens array, but avoid the undesirable distortion effects when an image is not being displayed, the system 12 includes an array 24 of electrowetting lens 26A, 26B (FIG. 2) overlaying the transparent display 18. The array 24 is operable so electrowetting lenses can be operated to enhance viewing of the transparent display 18, or operated to allow the operator 14 to be able to see clearly through the windshield 16 and transparent display 18. A detailed description of a suitable array 24 can be found in a paper entitled—A Full Description of a Scalable Microfabrication Process for Arrayed Electrowetting Microprisms, written by L. Hou et al., published Dec. 18, 2009 by JOURNAL OF MICROMECHANICS AND MICROENGINEERING, the entire contents of which are hereby incorporated by reference herein.

Figure 2:
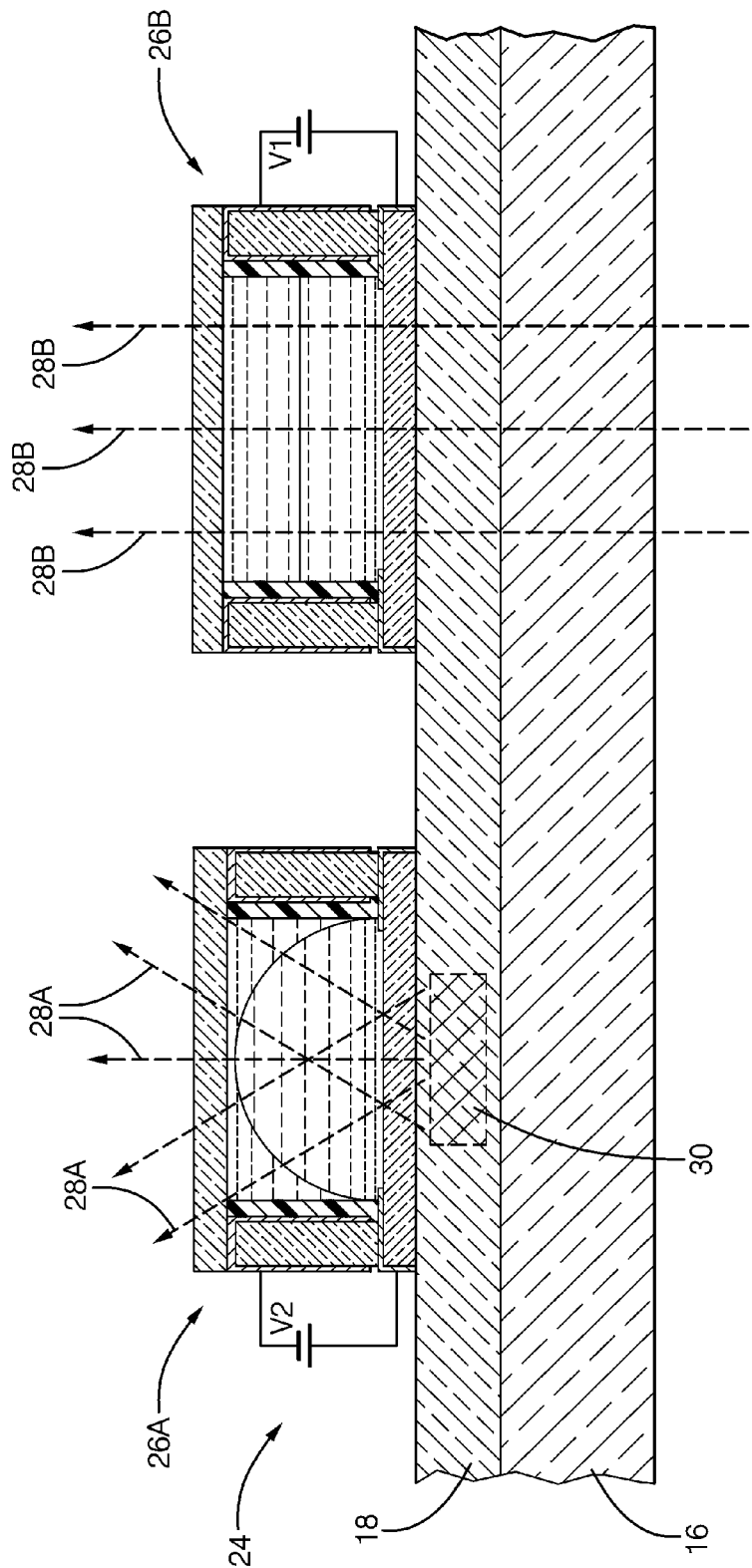
FIG. 2 is a sectional side view of a windshield assembly used in the system of FIG. 1 in accordance with one embodiment.

FIG. 2 illustrates a close-up sectional view of a windshield assembly that illustrates an arrangement of the windshield 16, the transparent display 18, and the array 24 of electrowetting lens 26A, 26B in a different orientation than shown in FIG. 1. It should be appreciated that two electrowetting lenses are illustrated only for the purpose of simplifying the explanation, and that the array 24 would typically comprise electrowetting lenses numbering from the thousands to the millions.

Electrowetting lens 26B is illustrated as being operated to a flat-state where light 28B passes through the electrowetting lens 26B substantially undistorted. As used herein, substantially undistorted means that the operator 14 would typically not find the degree of distortion objectionable when an electrowetting lens in operated to the flat-state. The electrowetting lens is typically operated to a flat-state by applying a voltage V1 as illustrated and having a typical value of one hundred (100) Volts. It is recognized that other electrowetting lens configurations are possible that would apply a different voltage value to operate the lens to a flat-state.

Electrowetting lens 26A is illustrated as being operated to a shaped-state where emitted light 28A from an underlying portion 30 of the transparent display 18 is directed in order to increase an apparent brightness of the emitted light 28A. Those skilled in the art will recognize that a greater portion of light emitted by the underlying portion 30 would be reflected away from the operator if the electrowetting lens 26A were operated to the flat state like electrowetting lens 26B. The light 28A from the underlying portion 30 may be light emitted from one or more pixels if the transparent display 18 is an active type, e.g. OLED or LCD. If the transparent display 18 is based on a fluorescent film, the light 28A from the underlying portion 30 may be in response to the underlying portion 30 being illuminated with UV light (not shown). For some lens configurations, an electrowetting lens may be operated to have the hemi-spherical shape illustrated in FIG. 2 as an example of the shaped-state by applying a voltage V2 of zero (0) Volts. It is also recognized that different voltage values can be applied to each side of the electrowetting lens to give an asymmetrical shape to the electrowetting lens and thereby direct the light in a different direction than nominally normal to the plane of the windshield 16 as suggested in FIG. 2

In one embodiment, electrowetting lenses that are adjacent to but not overlying the underlying portion 30 emitting light, for example electrowetting lens 26B, may be operated to a shaped-state in order to outline the image being displayed with a distortion region in order to highlight or contrast the image with respect to a background scene outside the vehicle 10. For example, if the scene outside vehicle along the line of site 22 is such that the image being displayed by the transparent display 18 is in effect camouflaged by the scene, electrowetting lenses surrounding the image may be operated to a shaped-state effective to distort or diffuse the background scene adjacent to or surrounding the image and thereby make it easier for the operator 14 to discern the image when viewed against the background. By way of further example, if the scene outside the vehicle includes straight lines and contrasting colors, as are often the case with roadside advertisements, roadway signs, or buildings; the electrowetting lenses may be operated to shaped-state to visually soften those straight lines and/or contrasting colors of the scene surrounding the image so the image that may itself include straight lines and contrasting colors is easier to see.

By combining the array 24 with the transparent display 18, a windshield display system 12 is provided that overcomes long standing problems associated with transparent displays on or used as vehicle windshields. The array 24 provides for selective magnification of pixels or portions of the transparent display 18, while maintaining vision clarity for the operator 14 in regions of the windshield 16 where images are not being displayed. Furthermore, the ability to outline or highlight images being displayed with a region of distortion of the background scene outside the vehicle 10 may help the operator 14 to better discern what is being displayed when the outside lighting conditions are less than ideal.

While this invention has been described in terms of the preferred embodiments thereof, it is not intended to be so limited, but rather only to the extent set forth in the claims that follow.

We claim:

1. A windshield display system configured for installation into a vehicle, said system comprising:
    a windshield;
    a transparent display overlaying the windshield, wherein the transparent display comprises a fluorescent film layer configured to fluoresce where illuminated with suitable light effective to display an image on the fluorescent film layer;
    an array of electrowetting lenses overlaying the transparent display, wherein each lens of the array is operable to a flat-state where light passes through the lens substantially undistorted, and a shaped-state where emitted light from an underlying portion of the transparent display is directed in order to increase an apparent brightness of the emitted light; and
    an ultraviolet laser configured to illuminate the fluorescent film layer with suitable light.

2. The system in accordance with claim 1, wherein the transparent display comprises an active display layer.

3. The system in accordance with claim 1, wherein the active display layer comprises an organic light emitting diode (OLED) layer.

4. The system in accordance with claim 1, wherein the active display layer comprises a liquid crystal device (LCD) layer.

5. The system in accordance with claim 1, wherein a lens adjacent to but not overlying the portion emitting light is operated to a shaped-state in order to outline the image being displayed and thereby highlight the image against a background scene outside the vehicle.

\* \* \* \* \*